United States Patent
Luo et al.

(10) Patent No.: US 12,109,765 B2
(45) Date of Patent: Oct. 8, 2024

(54) HYDRAULIC PRESS FOR FIBER-REINFORCED PLASTIC (FRP) PRODUCT

(71) Applicant: JIANGSU YANGLI HYDRAULIC EQUIPMENT CO., LTD., Yangzhou (CN)

(72) Inventors: Guilin Luo, Yangzhou (CN); Lihui Qiao, Yangzhou (CN)

(73) Assignee: JIANGSU YANGLI HYDRAULIC EQUIPMENT CO., LTD., Yangzhou (CN)

( * ) Notice: Subject to any disclaimer, the term of this patent is extended or adjusted under 35 U.S.C. 154(b) by 166 days.

(21) Appl. No.: 17/914,360

(22) PCT Filed: Oct. 29, 2020

(86) PCT No.: PCT/CN2020/124674
§ 371 (c)(1),
(2) Date: Sep. 26, 2022

(87) PCT Pub. No.: WO2021/208404
PCT Pub. Date: Oct. 21, 2021

(65) Prior Publication Data
US 2023/0107481 A1      Apr. 6, 2023

(30) Foreign Application Priority Data

Apr. 17, 2020    (CN) .......................... 202010304182.7

(51) Int. Cl.
*B30B 1/34*     (2006.01)
*B29C 70/42*    (2006.01)
(Continued)

(52) U.S. Cl.
CPC ............ *B29C 70/42* (2013.01); *B30B 1/34* (2013.01); *B30B 15/0052* (2013.01);
(Continued)

(58) Field of Classification Search
CPC ............................... B30B 15/163; B30B 1/34
See application file for complete search history.

(56) References Cited

U.S. PATENT DOCUMENTS

| 2,296,072 | A | * | 9/1942 | Tucker | B30B 1/34 |
|---|---|---|---|---|---|
| | | | | | 425/408 |
| 4,721,028 | A | * | 1/1988 | Lucas | B30B 15/16 |
| | | | | | 91/433 |
| 5,042,336 | A | * | 8/1991 | Capps | B30B 15/26 |
| | | | | | 83/13 |

FOREIGN PATENT DOCUMENTS

| CN | 1727699 A | * | 2/2006 | |
|---|---|---|---|---|
| CN | 1290690 C | * | 12/2006 | B21J 9/16 |

(Continued)

*Primary Examiner* — Timothy Kennedy
(74) *Attorney, Agent, or Firm* — Bayramoglu Law Offices LLC (57) ABSTRACT

A hydraulic press includes a workbench having four corners provided with uprights. The uprights are arranged in two rows front and rear, and the tops of the uprights in each row are connected by an upper beam extending in a left-right direction. Tie rods are inserted in the front and rear of each upright. The tie rods each have an upper end protruding from the top of the upper beam and fixed to the upper beam by an upper nut and a lower end protruding from the bottom of the workbench and fixed to the workbench by a lower nut. A central cylinder is provided at the center of the upper beam. Side cylinders are symmetrically arranged on the left and right of the central cylinder. The lower ends of plungers of the central cylinder and the side cylinders are fixedly connected to a top of a slider.

17 Claims, 4 Drawing Sheets

(51) Int. Cl.
*B30B 15/00* (2006.01)
*B30B 15/04* (2006.01)
*B30B 15/16* (2006.01)
*B30B 15/18* (2006.01)
*F15B 1/26* (2006.01)
*F15B 13/02* (2006.01)

(52) U.S. Cl.
CPC .......... *B30B 15/045* (2013.01); *B30B 15/163* (2013.01); *B30B 15/166* (2013.01); *B30B 15/186* (2013.01); *F15B 1/26* (2013.01); *F15B 13/02* (2013.01); *F15B 2211/40576* (2013.01)

(56) References Cited

FOREIGN PATENT DOCUMENTS

| | | | | | |
|---|---|---|---|---|---|
| CN | 101985246 | A | * | 3/2011 | |
| CN | 205705394 | U | * | 11/2016 | |
| CN | 107893784 | A | * | 4/2018 | ............. B30B 15/16 |
| CN | 207583714 | U | * | 7/2018 | ............. B30B 15/16 |
| CN | 109760365 | A | * | 5/2019 | |
| CN | 110154434 | A | * | 8/2019 | ............... B30B 1/34 |
| CN | 110682569 | A | * | 1/2020 | |
| DE | 19642635 | A1 | * | 10/1997 | ............. B21D 28/16 |
| DE | 102013109490 | A1 | * | 3/2015 | ............... B30B 1/34 |
| EP | 0207639 | A1 | * | 1/1987 | ............. B30B 15/24 |

\* cited by examiner

HYDRAULIC PRESS FOR FIBER-REINFORCED PLASTIC (FRP) PRODUCT

CROSS REFERENCE TO THE RELATED APPLICATIONS

This application is the national phase entry of International Application No. PCT/CN2020/124674, filed on Oct. 29, 2020, which is based upon and claims priority to Chinese Patent Application No. 202010304182.7, filed on Apr. 17, 2020, the entire contents of which are incorporated herein by reference.

TECHNICAL FIELD

The present disclosure relates to a hydraulic press, in particular to a hydraulic press for a fiber-reinforced plastic (FRP) product, and belongs to the technical field of hydraulic machines.

BACKGROUND

Fiber-reinforced plastic (FRP) products feature lightweight, high strength, corrosion resistance, and thermal insulation, etc. FRP products have been in the leading position of high-tech development in various industries of the national economy and become one of the main development directions to adjust the traditional industrial technology structure and product structure. FRP products usually use glass fiber or carbon fiber to reinforce unsaturated polyester, epoxy resin, or phenolic resin as the matrix. According to the different types of resins used, FRP products are divided into polyester-based FRP products, epoxy-based FRP products, and phenolic-based FRP products.

At present, the hydraulic presses for fabricating FRP products in the world adopt a single hydraulic transmission form. The main body of the hydraulic press generally adopts three typical structures, namely a four-upright structure, a combined frame structure, and an integral frame structure. The slider pressing stroke and closing height are determined by the size of the main pressing cylinder. Generally, the fabrication of large-scale FRP products requires the hydraulic press to provide a large pressing force and have a long-stroke slider and a working table with a width of at least 3 m. At present, the size of the high-pressure large-sized long-stroke cylinder is limited due to the manufacturing level. In addition, since the manufacture of the plunger cylinder is simpler and more flexible than the manufacture of the piston cylinder, the plunger cylinder is increasingly used in the hydraulic press.

The traditional hydraulic press has the following shortcomings. 1. The opening and closing of the filling valve are slow and unstable. 2. The constant downward speed of the slider cannot provide fast speed under no load and slow speed under heavy load and high pressure, thereby failing to achieve the tonnage conversion. 3. Due to the lack of the energy accumulator and the proportional flow valve, the transition of the downward and return journeys is not smooth and there is an obvious pause. 4. The layouts of the cylinders and the tie rods are fixed, which cannot solve the problem of stress concentration.

SUMMARY

To solve the problems existing in the prior art, an objective of the present disclosure is to provide a hydraulic press for a fiber-reinforced plastic (FRP) product. The present disclosure designs a large-area workbench, a large-stroke slider, and can provide a large pressing force, which satisfies the pressing requirements of a large-sized FRP product, and avoids stress concentration occurring on the workbench.

To solve the above technical problem, the present disclosure provides a hydraulic press for a fiber-reinforced plastic (FRP) product. The hydraulic press includes a workbench 4, where four corners of the workbench 4 are provided with uprights 2. The uprights are arranged in two rows front and rear, and the tops of the uprights in each row are connected by an upper beam 1 extending in a left-right direction. Tie rods 10 are inserted in the front and rear of each upright. The tie rods 10 each have an upper end protruding from the top of the upper beam 1 and fixed to the upper beam 1 by an upper nut and a lower end protruding from the bottom of the workbench 4 and fixed to the workbench by a lower nut. A central cylinder 5 is provided at the center of the upper beam 1. Side cylinders 6 are symmetrically arranged on the left and right of central cylinder 5. The lower ends of plungers of the central cylinder 5 and the side cylinders 6 are fixedly connected to the top of slider 3. A return cylinder 7 and a mold opening cylinder 8 are arranged between the uprights 2 on the same side. The return cylinders 7 on the left and right are distributed diagonally, and the mold opening cylinders 8 on the left and right are also distributed diagonally. The central cylinder 5 and the side cylinders 6 are each connected to an oil tank through a filling valve D0.

Compared with the prior art, the present disclosure has the following beneficial effects. The body of the large-area workbench is provided with eight tie rods, and the main oil cylinder is provided with two central cylinders 5 and four side cylinders 6 that are evenly distributed on the upper beams 1. The diagonally arranged return cylinders 7 and mold opening cylinders 8 are provided between the uprights on either side. This structure solves the problem of stress concentration on a working table. The central cylinders 5, the side cylinders 6, and the return cylinders 7 are single-chamber plunger cylinders, which have low manufacturing costs and large strokes. The FRP product must be heated to cure the resin during pressing, and the resin is pressed while curing. A heating rod is located in a mold, and the pressing pressure is comprehensively determined according to factors, such as heating temperature, product thickness, curing time, and material density. Low-tonnage pressing can be achieved by the two central cylinders 5 alone, and high-tonnage pressing can be achieved by the four side cylinders 6 alone. For higher-tonnage pressing, since the FRP product is not cured and is still loose in the initial stage of heating, direct pressing to the maximum tonnage is likely to cause waste. In this regard, the central cylinders 5 alone first move forward to enable the slider to press the FRP workpiece under a small tonnage. After the FRP product is heated and initially cured, the four side cylinders 6 join to achieve the maximum tonnage pressing. Alternatively, the side cylinders 6 alone first move forward and implement pressing, and then the central cylinders 5 join to press together. In this way, the present disclosure improves the working speed of the slider, improves the pressing efficiency, and thus improves the quality of the FRP product.

As an improvement of the present disclosure, a main pressure oil passage G1 is connected to an inlet of a tenth cartridge valve C10, and an outlet of the tenth cartridge valve C10 is connected to an inlet of an eleventh cartridge valve C11. An outlet of the eleventh cartridge valve C11 is connected to inlets of a first accumulator AC1 and a twelfth cartridge valve C12; an outlet of the twelfth cartridge valve C12 is connected to a P port of a seventeenth electro-hydraulic reversing valve YA17. An A port of the seventeenth electro-hydraulic reversing valve YA17 is connected to a hydraulic control port of each filling valve DO. An oil port of the central cylinder 5 is connected to an outlet of a nineteenth cartridge valve C19 and an inlet of a twentieth cartridge valve C20. An oil port of the side cylinder 6 is connected to an outlet of a twenty-third cartridge valve C23 and an inlet of the twenty-first cartridge valve C21; inlets of the nineteenth cartridge valve C19 and the twenty-third cartridge valve C23 are connected to the main pressure oil passage G1. Outlets of the twentieth cartridge valve C20 and the twenty-first cartridge valve C21 are connected to an inlet of a twenty-second cartridge valve C22, and an outlet of the twenty-second cartridge valve C22 is connected to the oil tank.

When the slider goes down fast, the nineteenth cartridge valve C19 is opened, such that pressure oil enters the central cylinder 5. The twenty-third cartridge valve C23 is opened, such that the pressure oil enters the side cylinder 6. The sixteenth cartridge valve C16 is opened, such that the return cylinder 7 communicates with the oil tank. When the slider goes down slowly, the nineteenth cartridge valve C19 is opened alone, such that the central cylinder 5 implements pressing alone. The twenty-third cartridge valve C23 is opened alone, such that the side cylinder 6 implements pressing alone. The nineteenth cartridge valve C19 and the twenty-third cartridge valve C23 are opened at the same time, such that the central cylinder 5 and the side cylinder 6 implement pressing together. The twenty-second cartridge valve C22 is opened. The twentieth cartridge valve C20 and the twenty-first cartridge valve C21 are opened. The central cylinder 5 is pre-relieved of pressure through the twentieth cartridge valve C20 and the twenty-second cartridge valve C22. The side cylinder 6 is pre-relieved of pressure through the twenty-first cartridge valve C21 and the twenty-second cartridge valve C22. The tenth cartridge valve C10. The pressure oil enters the hydraulic control port of each filling valve DO through the tenth cartridge valve C10, the eleventh cartridge valve C11, and the twelfth cartridge valve C12. Each filling valve DO is opened to achieve complete pressure relief.

As a further improvement of the present disclosure, an oil port of the return cylinder 7 is connected to an outlet of a sixteenth cartridge valve C16; an inlet of the sixteenth cartridge valve C16 is connected to an outlet of a seventeenth cartridge valve C17. An inlet of a fifteenth cartridge valve C15, and an A port of a second proportional flow valve YAB; a B port of the second proportional flow valve YAB is connected to an inlet of an eighteenth cartridge valve C18, and an outlet of the eighteenth cartridge valve C18 is connected to the oil tank.

When the slider goes down fast, the eighteenth cartridge valve C18 is opened. The second proportional flow valve YAB receives a given voltage signal and opens to a maximum extent. The sixteenth cartridge valve C16 is opened, such that the return cylinder 7 communicates with the oil tank. When the slider goes down fast to a set switching point, the given voltage signal received by the second proportional flow valve YAB gradually decreases according to a curve programmed by pulse oscillation software, such that the opening of the second proportional flow valve YAB gradually decreases to a certain value. Then, the eighteenth cartridge valve C18 is closed, and the fifteenth cartridge valve C15 controls the back pressure of the return cylinder 7, such that the slider goes down slowly. When the slider returns, the seventeenth cartridge valve C17 is opened. The pressure oil flows through the seventeenth cartridge valve C17 and pushes open the sixteenth cartridge valve C16 into the return cylinder 7 to drive the slider to go upward. The sixteenth cartridge valve C16 can prevent the slider from sliding down.

As a further improvement of the present disclosure, an oil port of a lower chamber of the mold opening cylinder 8 is connected to an outlet of a twenty-eighth cartridge valve C28 and an inlet of a twenty-seventh cartridge valve C27. An oil port of an upper chamber of the mold opening cylinder 8 is connected to an outlet of a thirtieth cartridge valve C30 and an inlet of a twenty-ninth cartridge valve C29; inlets of the twenty-eighth cartridge valve C28 and the thirtieth cartridge valve C30 are connected to an outlet of a twenty-sixth cartridge valve C26. An inlet of the twenty-sixth cartridge valve C26 is connected to the main pressure oil passage G1, and outlets of the twenty-seventh cartridge valve C27 and the twenty-ninth cartridge valve C29 are connected to the oil tank. Since the FRP product is easily bonded to the mold after heating and pressing, the direct and rapid return of the slider is likely to cause surface damage, deformation of the FRP product, and even cause waste. Therefore, before the slider returns, the FRP product is first released from the upper mold, and then the slider is fast returned upward. When the mold opening cylinder ejects, the thirtieth cartridge valve C30 is closed, and the twenty-sixth cartridge valve C26 is opened. The pressure oil enters the lower chamber of the mold opening cylinder 8 through the twenty-sixth cartridge valve C26 and the twenty-eighth cartridge valve C28, such that a piston rod of the mold opening cylinder 8 is extended to realize mold opening. The upper chamber of the mold opening cylinder 8 returns oil to the oil tank through the twenty-ninth cartridge valve C29. The FRP product uses a large amount of epoxy resin, so its adhesion with the mold is large, and the direct and rapid return may easily cause the FRP product to be damaged. The slider is slowly raised under the action of the mold opening cylinder. An upper mold and a lower mold are separated first to avoid damage to the FRP workpiece by direct return. The mold opening cylinder stops after reaching a limit. When the mold opening cylinder returns, the twenty-sixth cartridge valve C26 is opened, and the thirtieth cartridge valve C30 is opened. The pressure oil enters the upper chamber of the mold opening cylinder 8 through the twenty-sixth cartridge valve C26 and the thirtieth cartridge valve C30, such that the piston rod of the mold opening cylinder 8 is retracted. The lower chamber of the mold opening cylinder 8 returns oil to the oil tank through the twenty-seventh cartridge valve C27.

As a further improvement of the present disclosure, an inlet of a fourteenth cartridge valve C14 and a B port of a first proportional flow valve YAA are connected to the main pressure oil passage G1; an outlet of the fourteenth cartridge valve C14 is connected to an inlet of a thirteenth cartridge valve C13. An outlet of the thirteenth cartridge valve C13 is connected to a large accumulator and an A port of the first proportional flow valve YAA; control oil ports of the first proportional flow valve YAA and the second proportional flow valve YAB are connected to outlets of a sixth accumulator AC6 and a twenty-fourth cartridge valve C24. An inlet of the twenty-fourth cartridge valve C24 is connected to an outlet of a constant-power variable pump P3 and an inlet of a twenty-fifth cartridge valve C25, and the outlet of the twenty-fifth cartridge valve C25 is connected to the oil tank. A hydraulic control port of the twenty-fifth cartridge valve C25 is connected to an inlet of a tenth pressure regulating valve F10 and a B port of a sixth electromagnetic reversing valve YA6. A T port of the sixth electromagnetic reversing valve YA6 and an outlet of the tenth pressure regulating valve F10 are connected to the oil tank. A hydraulic control port of a fourteenth cartridge valve C14 is connected to an A port of a fifteenth electromagnetic reversing valve YA15. A P port of the fifteenth electromagnetic reversing valve YA15 is connected to an inlet of the fourteenth cartridge valve C14. An outlet of the large accumulator is provided with a second pressure sensor BP2, and the outlet of the sixth accumulator AC6 is provided with a fifth pressure sensor BPS.

The control oil of the first proportional flow valve YAA and the second proportional flow valve YAB is provided by the accumulator AC6. The accumulator AC6 is filled with oil by the constant-power variable pump P3. The constant-power variable pump P3 is driven by a 7.5 KW three-phase asynchronous motor. The sixth electromagnetic reversing valve YA6 is energized to close the twenty-fifth cartridge valve C25. The constant-power variable pump P3 fills the sixth accumulator AC6 with oil through the twenty-fourth cartridge valve C24. The filling pressure is detected and controlled by the fifth pressure sensor BPS. When the slider maintains the pressure, the fifteenth electromagnetic reversing valve YA15 is energized to open the fourteenth cartridge valve C14. The pressure oil is filled into the large accumulators, i.e. the second accumulator AC2 to the fifth accumulator AC5, through the thirteenth cartridge valve C13. The filling pressure is controlled by the second pressure sensor BP2. When the slider returns, the first proportional flow valve YAA opens as required by a control system. The pressure oil in the second accumulator AC2 to the fifth accumulator AC5 is supplemented into the return oil passage to meet the requirement of a fast return. The opening size of the first proportional flow valve YAA is controlled by a pulse oscillation curve.

As a further improvement of the present disclosure, the main pressure oil passage G1 is connected to a P port of a second three-position four-way reversing valve with a float center. An A port of the second three-position four-way reversing valve is connected to an inlet of a fourth one-way valve D4 and a hydraulic control port of a fifth one-way valve D5. A B port of the second three-position four-way reversing valve is connected to an inlet of the fifth one-way valve D5 and a hydraulic control port of the fourth one-way valve D4. An outlet of the fourth one-way valve D4 is connected to a lower chamber of a pin cylinder 9, and an outlet of the fifth one-way valve D5 is connected to an upper chamber of the pin cylinder 9. When the mold of the hydraulic press needs repair or changes in an idle state, the slider returns to an upper limit position. A right coil YA22 of the second three-position four-way reversing valve is energized, and a piston rod of the pin cylinder 9 is extended to lock the slider. The right coil YA22 of the second three-position four-way reversing valve is de-energized and a left coil YA21 thereof is energized, such that the piston rod of the pin cylinder 9 is retracted to release the slider.

As a further improvement of the present disclosure, a hydraulic control port of the tenth cartridge valve C10 is connected to an A port of a sixteenth electromagnetic reversing valve YA16, and a P port of the sixteenth electromagnetic reversing valve YA16 is connected to an inlet of the tenth cartridge valve C10. An outlet of the first accumulator AC1 is provided with a first pressure sensor BP1. A hydraulic control port of the eleventh cartridge valve C11 is connected to the outlet thereof, and a hydraulic control port of the twelfth cartridge valve C12 is connected to the outlet thereof. A hydraulic control port of the nineteenth cartridge valve C19 is connected to a neutral outlet of a first shuttle valve S1. A left inlet of the first shuttle valve S1 is connected to an outlet of the nineteenth cartridge valve C19; a right inlet of the first shuttle valve S1 is connected to an A port of an eighth electromagnetic reversing valve YA8. A P port of the eighth electromagnetic reversing valve YA8 is connected to an inlet of the nineteenth cartridge valve C19; an oil passage of the central cylinder 5 is provided with a third pressure sensor BP3. A hydraulic control port of the twentieth cartridge valve C20 is connected to the outlet thereof, and a hydraulic control port of the twenty-first cartridge valve C21 is connected to the outlet thereof. A hydraulic control port of the twenty-second cartridge valve C22 is connected to an A port of a ninth electromagnetic reversing valve YA9, and a P port of the ninth electromagnetic reversing valve YA9 is connected to an inlet of the twenty-second cartridge valve C22. A hydraulic control port of the twenty-third cartridge valve C23 is connected to a neutral outlet of a second shuttle valve S2. A left inlet of the second shuttle valve S2 is connected to the outlet of the twenty-third cartridge valve C23, and a right inlet of the second shuttle valve S2 is connected to an A port of a seventh electromagnetic reversing valve YA7. A P port of the seventh electromagnetic reversing valve YA7 is connected to an inlet of the twenty-third cartridge valve C23. An oil passage of the side cylinder 6 is provided with a fourth pressure sensor BP4.

When the slider goes down fast, the seventh electromagnetic reversing valve YA7 is energized to open the twenty-third cartridge valve C23, and the pressure oil enters the side cylinder 6. The eighth electromagnetic reversing valve YA8 is energized, such that the nineteenth cartridge valve C19 is opened, and the pressure oil enters the central cylinder 5. When the slider presses, the sixteenth electromagnetic reversing valve YA16 is energized to open the tenth cartridge valve C10, and the first accumulator AC1 is supplemented with pressure. The de-energization of the sixteenth electromagnetic directional valve YA16 is controlled by the first pressure sensor BP1. The pressure of the central cylinder 5 is controlled by the third pressure sensor BP3, and when a set pressure is reached, the eighth electromagnetic reversing valve YA8 is de-energized. The pressure of the side cylinder 6 is controlled by the fourth pressure sensor BP4, and when a set pressure is reached, the seventh electromagnetic reversing valve YA7 is de-energized. When the slider relieves pressure, the sixteenth electromagnetic reversing valve YA16 is energized to open the tenth cartridge valve C10. The seventeenth electro-hydraulic reversing valve YA17 is energized, such that the pressure oil enters the hydraulic control port of each filling valve D0 through the tenth cartridge valve C10, the eleventh cartridge valve C11, the twelfth cartridge valve C12, and the A port of the seventeenth electro-hydraulic reversing valve YA17. Thus, each filling valve D0 is opened. The first accumulator AC1 can play a stabilizing role to fill the pipeline with oil to improve the response time of opening each filling valve D0 and realize rapid pressure relief. The seventeenth electro-hydraulic reversing valve YA17 responds fast and can open each filling valve D0 fast, stably, and reliably with the help of the first accumulator AC1.

As a further improvement of the present disclosure, a hydraulic control port of the fifteenth cartridge valve C15 is connected to an inlet of an eighth pressure regulating valve F8, an inlet of a ninth pressure regulating valve F9, and a P port of a fourteenth electromagnetic reversing valve YA14. An outlet of the ninth pressure regulating valve F9 is connected to an A port of the fourteenth electromagnetic reversing valve YA14. A T port of the fourteenth electromagnetic reversing valve YA14 and an outlet of the eighth pressure regulating valve F8 are connected to the oil tank. A hydraulic control port of the sixteenth cartridge valve C16 is connected to an A port of an eleventh electromagnetic ball valve YAW The eleventh electromagnetic ball valve YA11 is a two-position three-way valve and has a P port connected to the outlet of the sixteenth cartridge valve C16. The outlet of the sixteenth cartridge valve C16 is further connected to the oil tank through a seventh pressure regulating valve F7; the inlet of the sixteenth cartridge valve C16 is further connected to a P port of a twelfth electromagnetic reversing valve YA12 through a throttle valve J1. A B port and a T port of the twelfth electromagnetic reversing valve YA12 are connected to the oil tank. A hydraulic control port of the seventeenth cartridge valve C17 is connected to a neutral outlet of a third shuttle valve S3; a left inlet of the third shuttle valve S3 is connected to the outlet of the seventeenth cartridge valve C17, and a right inlet of the third shuttle valve S3 is connected to an A port of a tenth electromagnetic reversing valve YA10. A P port of the tenth electromagnetic reversing valve YA10 is connected to an inlet of the seventeenth cartridge valve C17. A hydraulic control port of the eighteenth cartridge valve C18 is connected to an A port of a thirteenth electromagnetic reversing valve YA13; a P port of the thirteenth electromagnetic reversing valve YA13 is connected to the inlet of the eighteenth cartridge valve C18. The outlet of the eighteenth cartridge valve C18 is connected to the oil tank.

When the slider goes down fast, the thirteenth electromagnetic reversing valve YA13 is energized to open the eighteenth cartridge valve C18. The second proportional flow valve YAB is opened to a maximum extent. The eleventh electromagnetic ball valve YA11 is energized to open the sixteenth cartridge valve C16, and the return cylinder 7 communicates with the oil tank. When the slider goes down fast to a set switching point, the thirteenth electromagnetic reversing valve YA13 is de-energized to make the eighteenth cartridge valve C18 close. Meanwhile, the fourteenth electromagnetic reversing valve YA14 is energized, and the fifteenth cartridge valve C15 is put into operation, such that the pressure of the return cylinder 7 is controlled by 3-8 MPa of the ninth pressure regulating valve F9. In this way, slider 3 goes down slowly with a back pressure under the pressing of the central cylinder alone. An eighth pressure regulating valve F8 serves as a safety valve and has a return pressure of 25 MPa. When the slider returns, the tenth electromagnetic reversing valve YA10 is energized to open the seventeenth cartridge valve C17. The pressure oil flows into the return cylinder 7. The sixteenth cartridge valve C16 cooperates with the eleventh electromagnetic ball valve YA11 to effectively prevent the slider from sliding down. Micro-motion mold matching is implemented after the upper mold and the lower mold are arranged. The fourteenth electromagnetic reversing valve YA14 is de-energized, such that the fifteenth cartridge valve C15 is closed. The eleventh electromagnetic ball valve YA11 continues being energized to keep the sixteenth cartridge valve C16 open. The twelfth electromagnetic reversing valve YA12 is energized, such that the return cylinder 7 communicates with the oil tank through the throttle valve J1. The slider 3 falls under its own weight to verify the accuracy of the mold setting. The pressure-free downward speed of the slider can be adjusted through the throttle valve J1, and the downward distance is controlled based on the energization time of the eleventh electromagnetic ball valve YA11.

As a further improvement of the present disclosure, a hydraulic control port of the twenty-sixth cartridge valve C26 is connected to an A port of an eighteenth electromagnetic reversing valve YA18. A B port of the eighteenth electromagnetic reversing valve YA18 is connected to the outlet of the twenty-sixth cartridge valve C26. A P port of the eighteenth electromagnetic reversing valve YA18 is connected to the main pressure oil passage Gl. A T port of the eighteenth electromagnetic reversing valve YA18 is connected to the oil tank. A hydraulic control port of the twenty-seventh cartridge valve C27 is connected to an A port of a first three-position four-way reversing valve with a regen center through a first one-way valve D1. A hydraulic control port of the twenty-eighth cartridge valve C28 is connected to a neutral outlet of a fourth shuttle valve S4. A left inlet of the fourth shuttle valve S4 is connected to the outlet of the twenty-eighth cartridge valve C28, and a right inlet of the fourth shuttle valve S4 is connected to a B port of the first three-position four-way reversing valve. A hydraulic control port of the twenty-ninth cartridge valve C29 is connected to the B port of the first three-position four-way reversing valve through a second one-way valve D2. A hydraulic control port of the thirtieth cartridge valve C30 is connected to the A port of the first three-position four-way reversing valve. The inlet of the thirtieth cartridge valve C30 is connected to a P port of the first three-position four-way reversing valve through a third one-way valve D3. A T port of the first three-position four-way reversing valve is connected to the oil tank.

When the mold opening cylinder ejects, a right coil YA19 of the first three-position four-way reversing valve is energized to close the thirtieth cartridge valve C30. The hydraulic control port of the twenty-ninth cartridge valve C29 is relieved of the pressure to the B port of the first three-position four-way reversing valve through the second one-way valve D2. The eighteenth electromagnetic reversing valve YA18 is energized to open the twenty-sixth cartridge valve C26. The pressure oil enters the lower chamber of the mold opening cylinder 8 through the twenty-sixth cartridge valve C26 and the twenty-eighth cartridge valve C28, such that a piston rod of the mold opening cylinder 8 is extended to realize the mold opening. The upper chamber of the mold opening cylinder 8 returns oil to the oil tank through the twenty-ninth cartridge valve C29. The slider is slowly raised under the action of the mold opening cylinder. The upper mold and the lower mold are separated first to avoid damage to the FRP workpiece by direct return. The mold opening cylinder stops after reaching a limit. The pressure at the left inlet of the fourth shuttle valve S4 ensures that the twenty-eighth cartridge valve C28 is closed, preventing the slider from sliding down. When the mold opening cylinder returns, the eighteenth electromagnetic reversing valve YA18 is energized to open the twenty-sixth cartridge valve C26. The right coil YA19 of the first three-position four-way reversing valve is de-energized and a left coil YA20 thereof is energized, such that the thirtieth cartridge valve C30 is opened. The hydraulic control port of the twenty-seventh cartridge valve C27 is relieved of the pressure to the A port of the first three-position four-way reversing valve through the first one-way valve Dl. The pressure oil enters the upper chamber of the mold opening cylinder 8 through the twenty-sixth cartridge valve C26 and the thirtieth cartridge valve C30, such that the piston rod of the mold opening cylinder 8 is retracted. The lower chamber of the mold opening cylinder 8 returns the pressure oil to the oil tank through the twenty-seventh cartridge valve C27.

As a further improvement of the present disclosure, an outlet of a large pump P1a of a first double gear pump is connected to inlets of a first cartridge valve C1 and a second cartridge valve C2. A hydraulic control port of the second cartridge valve C2 is connected to a B port of the first electromagnetic reversing valve YA1. An outlet of a small pump P1b of the first double gear pump is connected to inlets of a third cartridge valve C3 and a fourth cartridge valve C4. A hydraulic control port of the fourth cartridge valve C4 is connected to a B port of a second electromagnetic reversing valve YA2. An outlet of a large pump P2a of a second double gear pump is connected to inlets of a fifth cartridge valve C5 and a sixth cartridge valve C6. A hydraulic control port of the sixth cartridge valve C6 is connected to a B port of a third electromagnetic reversing valve YA3. An outlet of a small pump P2b of the second double gear pump is connected to inlets of a seventh cartridge valve C7 and an eighth cartridge valve C8. A hydraulic control port of the eighth cartridge valve C8 is connected to a B port of a fourth electromagnetic reversing valve YA4. Outlets of the first cartridge valve C1, the third cartridge valve C3, the fifth cartridge valve C5, and the seventh cartridge valve C7 are connected to the main pressure oil passage G1 and an inlet of a ninth cartridge valve C9. A hydraulic control port of the ninth cartridge valve C9 is connected to a B port of a fifth electromagnetic reversing valve YA5. T ports of the first electromagnetic reversing valve YA1, the second electromagnetic reversing valve YA2, the third electromagnetic reversing valve YA3, the fourth electromagnetic reversing valve YA4, and the fifth electromagnetic reversing valve YA5 are connected to the oil tank. Outlets of the second cartridge valve C2, the fourth cartridge valve C4, the sixth cartridge valve C6, the eighth cartridge valve C8, and the ninth cartridge valve C9 are connected to the oil tank.

When the slider goes down fast and returns, the first electromagnetic reversing valve YA1 is energized to close the second cartridge valve C2. The second electromagnetic reversing valve YA2 is energized to close the fourth cartridge valve C4. The third electromagnetic reversing valve YA3 is energized to close the sixth cartridge valve C6. The fourth electromagnetic reversing valve YA4 is energized to close the eighth cartridge valve C8. The fifth electromagnetic reversing valve YA5 is energized to close the ninth cartridge valve C9. Thus, the main pressure oil passage G1 builds up pressure. During the slow downward pressing of the slider, when the pressure sensor at a pump port detects that the pressure is greater than 10 MPa, the first electromagnetic reversing valve YA1 and the third electromagnetic reversing valve YA3 are de-energized. The second cartridge valve C2 and the sixth cartridge valve C6 are open. The pressure oil from the large pump P1a of the first double gear pump returns to the oil tank through the second cartridge valve C2, and the pressure oil from the large pump P2a of the second double gear pump returns to the oil tank through the sixth cartridge valve C6. The second electromagnetic reversing valve YA2, the fourth electromagnetic reversing valve YA4, and the fifth electromagnetic reversing valve YA5 keep energized. The small pump P1b of the first double gear pump and the small pump P2b of the second double gear pump keep supplying oil to the main pressure oil passage G1 until the pressing action is completed. Through the control conversion of the large and small pumps, the installed power and power consumption are reduced. When the slider relieves pressure, and the pin cylinder is extended or retracted, the second electromagnetic reversing valve YA2 is energized to close the fourth cartridge valve C4, and the fifth electromagnetic reversing valve YA5 is energized to close the ninth cartridge valve C9. The pressure oil fed by the small pump P1b of the first double gear pump is supplied into the main pressure oil passage G1 through the third cartridge valve C3, and pressure buildup is achieved. When the mold opening cylinder ejects and returns, the second electromagnetic reversing valve YA2 and the fifth electromagnetic reversing valve YA5 keep energized. The first electromagnetic reversing valve YA1 is energized, and the first double gear pump supplies oil to the main pressure oil passage G1 and builds up the pressure. The third electromagnetic reversing valve YA3 and the fourth electromagnetic reversing valve YA4 are de-energized, and the second double gear pump stops supplying oil.

BRIEF DESCRIPTION OF THE DRAWINGS

The present disclosure is described in further detail below with reference to the drawings and specific implementations. The drawings are provided for reference and illustration only and are not intended to limit the present disclosure.

Reference Numerals: 1. upper beam; 2. upright; 3. slider; 4. workbench; 5. central cylinder; 6. side cylinder; 7. return cylinder; 8. mold opening cylinder; 9. pin cylinder; 10. tie rod; G1. main pressure oil passage; D0. filling valve; C1. first cartridge valve; C30. thirtieth cartridge valve; D1. first one-way valve; D5. fifth one-way valve; YA1. first electromagnetic reversing valve; YA10. tenth electromagnetic reversing valve; YA11. eleventh electromagnetic ball valve; YA12. twelfth electromagnetic reversing valve; YA16. sixteenth electromagnetic reversing valve; YA17. seventeenth electro-hydraulic reversing valve; YA18. eighteenth electromagnetic reversing valve; YA19, YA20. first three-position four-way reversing valve; YA21, YA22. second three-position four-way reversing valve; S1. first shuttle valve, . . . , S4. fourth shuttle valve; F1. first pressure regulating valve, . . . , F13. thirteenth pressure regulating valve; AC1. first accumulator, . . . , AC6. sixth accumulator; and BP1. first pressure sensor, . . . , BP5. fifth pressure sensor.

DETAILED DESCRIPTION OF THE EMBODIMENTS

The present disclosure provides a hydraulic press for a fiber-reinforced plastic (FRP) product. As shown in FIGS. 1 to 4, the hydraulic press includes a workbench 4. Four corners of the workbench 4 are provided with uprights 2. The uprights are arranged in two rows front and rear, and the tops of the uprights in each row are connected by an upper beam 1 extending in a left-right direction. Tie rods 10 are inserted in the front and rear of each upright. An upper end of each tie rod 10 protrudes from the top of the upper beam 1 and is fixed to the upper beam 1 by an upper nut, and a lower end of each tie rod 10 protrudes from the bottom of the workbench 4 and is fixed to the workbench by a lower nut. A central cylinder 5 is provided at the center of the upper beam 1. Side cylinders 6 are symmetrically arranged on the left and right of the central cylinder 5. The lower ends of plungers of the central cylinder 5 and the side cylinders 6 are fixedly connected to the top of slider 3. A return cylinder 7 and a mold opening cylinder 8 are arranged between the uprights 2 on the same side. The return cylinders 7 on the left and right are distributed diagonally, and the mold opening cylinders 8 on the left and right are also distributed diagonally. The central cylinder 5 and the side cylinders 6 are each connected to an oil tank through a filling valve D0.

Figure 1:
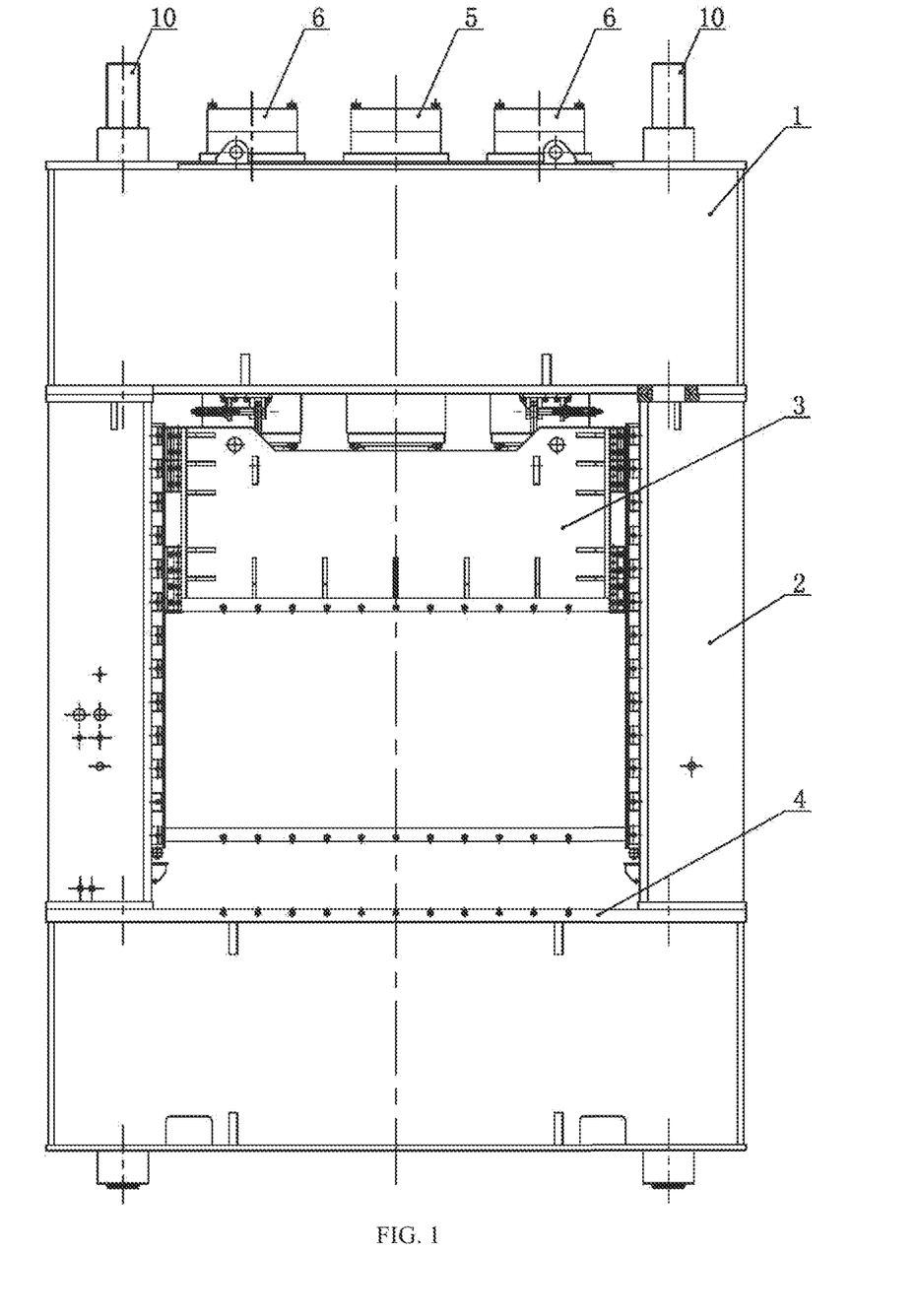
FIG. 1 is a front view of a hydraulic press for a fiber-reinforced plastic (FRP) product according to the present disclosure.
Figure 2:
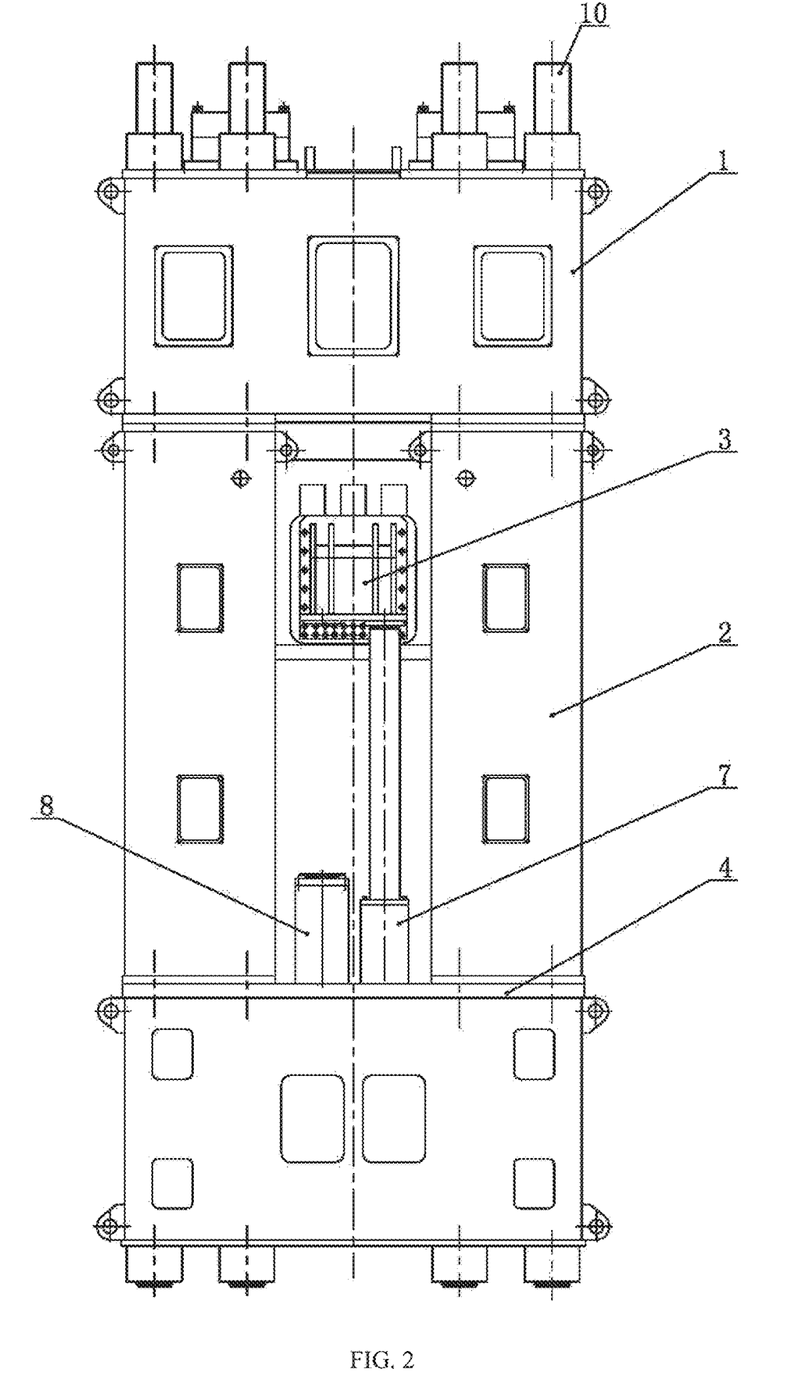
FIG. 2 is a left view of the hydraulic press for an FRP product shown in FIG. 1.
Figure 3:
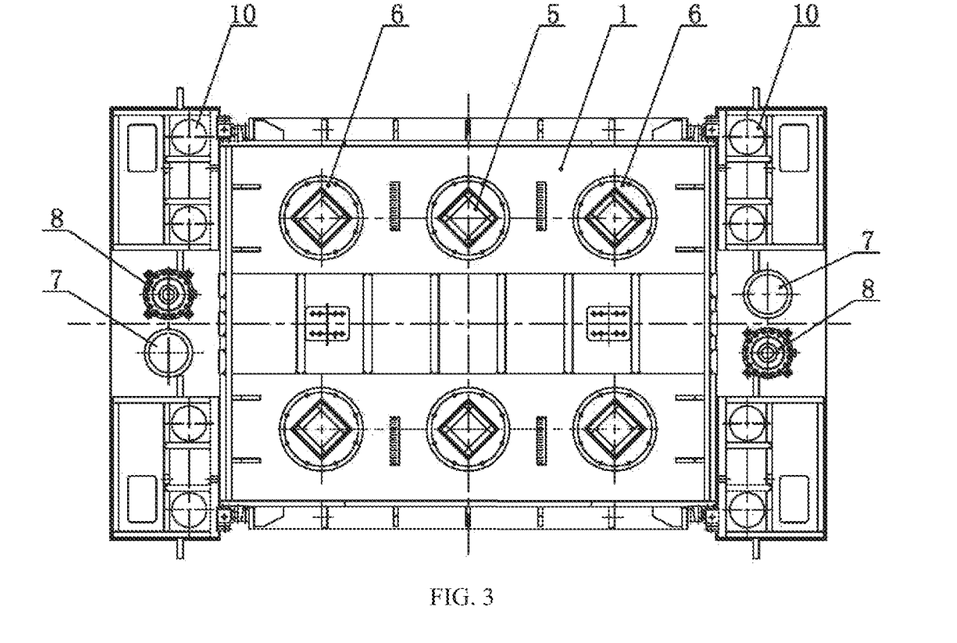
FIG. 3 is a top view of the hydraulic press for an FRP product shown in FIG. 1.
Figure 4:
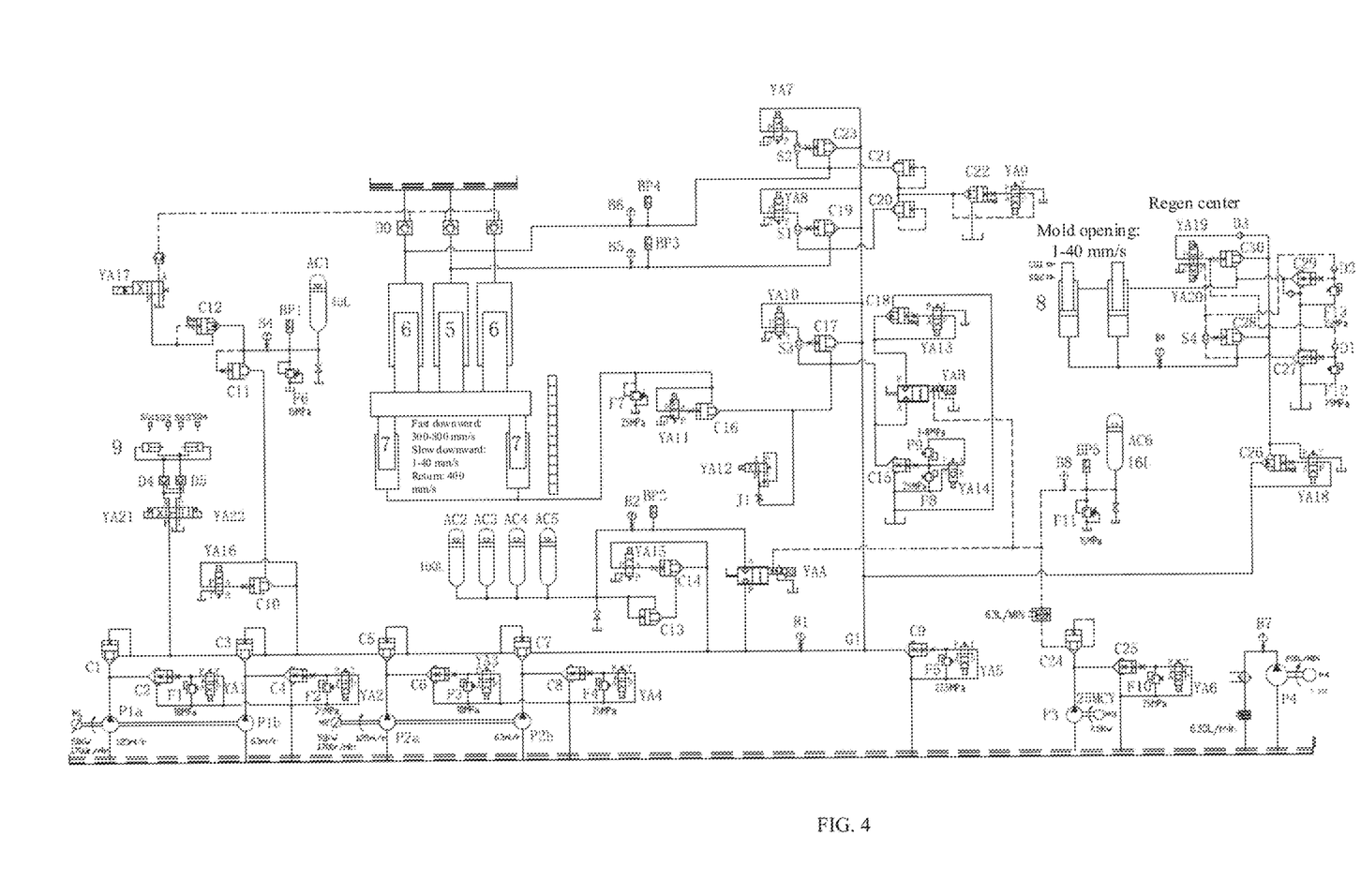
FIG. 4 is a schematic diagram of the hydraulic press for an FRP product according to the present disclosure.

A main pressure oil passage G1 is connected to an inlet of a tenth cartridge valve C10, and an outlet of the tenth cartridge valve C10 is connected to an inlet of an eleventh cartridge valve C11. An outlet of the eleventh cartridge valve C11 is connected to inlets of a first accumulator AC1 and a twelfth cartridge valve C12. An outlet of the twelfth cartridge valve C12 is connected to a P port of a seventeenth electro-hydraulic reversing valve YA17, and an A port of the seventeenth electro-hydraulic reversing valve YA17 is connected to a hydraulic control port of each filling valve D0. An oil port of the central cylinder 5 is connected to an outlet of a nineteenth cartridge valve C19 and an inlet of a twentieth cartridge valve C20. An oil port of the side cylinder 6 is connected to an outlet of a twenty-third cartridge valve C23 and an inlet of the twenty-first cartridge valve C21. Inlets of the nineteenth cartridge valve C19 and the twenty-third cartridge valve C23 are connected to the main pressure oil passage G1. Outlets of the twentieth cartridge valve C20 and the twenty-first cartridge valve C21 are connected to an inlet of a twenty-second cartridge valve C22. An outlet of the twenty-second cartridge valve C22 is connected to the oil tank.

An oil port of the return cylinder 7 is connected to an outlet of a sixteenth cartridge valve C16. An inlet of the sixteenth cartridge valve C16 is connected to an outlet of a seventeenth cartridge valve C17, an inlet of a fifteenth cartridge valve C15, and an A port of a second proportional flow valve YAB. A B port of the second proportional flow valve YAB is connected to an inlet of an eighteenth cartridge valve C18, and an outlet of the eighteenth cartridge valve C18 is connected to the oil tank.

An oil port of a lower chamber of the mold opening cylinder 8 is connected to an outlet of a twenty-eighth cartridge valve C28 and an inlet of a twenty-seventh cartridge valve C27. An oil port of an upper chamber of the mold opening cylinder 8 is connected to an outlet of a thirtieth cartridge valve C30 and an inlet of a twenty-ninth cartridge valve C29. Inlets of the twenty-eighth cartridge valve C28 and the thirtieth cartridge valve C30 are connected to an outlet of the twenty-sixth cartridge valve C26. An inlet of the twenty-sixth cartridge valve C26 is connected to the main pressure oil passage G1. Outlets of the twenty-seventh cartridge valve C27 and the twenty-ninth cartridge valve C29 are connected to the oil tank.

An inlet of a fourteenth cartridge valve C14 and a B port of a first proportional flow valve YAA are connected to the main pressure oil passage G1. An outlet of the fourteenth cartridge valve C14 is connected to an inlet of a thirteenth cartridge valve C13, and an outlet of the thirteenth cartridge valve C13 is connected to a large accumulator and an A port of the first proportional flow valve YAA. Control oil ports of the first proportional flow valve YAA and the second proportional flow valve YAB are connected to outlets of a sixth accumulator AC6 and a twenty-fourth cartridge valve C24. An inlet of the twenty-fourth cartridge valve C24 is connected to an outlet of a constant-power variable pump P3 and an inlet of a twenty-fifth cartridge valve C25, and the outlet of the twenty-fifth cartridge valve C25 is connected to the oil tank. A hydraulic control port of the twenty-fifth cartridge valve C25 is connected to an inlet of a tenth pressure regulating valve F10 and a B port of a sixth electromagnetic reversing valve YA6. A T port of the sixth electromagnetic reversing valve YA6 and an outlet of the tenth pressure regulating valve F10 are connected to the oil tank. A hydraulic control port of a fourteenth cartridge valve C14 is connected to an A port of a fifteenth electromagnetic reversing valve YA15. A P port of the fifteenth electromagnetic reversing valve YA15 is connected to an inlet of the fourteenth cartridge valve C14. An outlet of the large accumulator is provided with a second pressure sensor BP2. The outlet of the sixth accumulator AC6 is provided with a fifth pressure sensor BPS.

The main pressure oil passage G1 is connected to a P port of a second three-position four-way reversing valve with a float center. An A port of the second three-position four-way reversing valve is connected to an inlet of a fourth one-way valve D4 and a hydraulic control port of a fifth one-way valve D5. A B port of the second three-position four-way reversing valve is connected to an inlet of the fifth one-way valve D5 and a hydraulic control port of the fourth one-way valve D4. An outlet of the fourth one-way valve D4 is connected to a lower chamber of a pin cylinder 9, and an outlet of the fifth one-way valve D5 is connected to an upper chamber of the pin cylinder 9.

A hydraulic control port of the tenth cartridge valve C10 is connected to an A port of a sixteenth electromagnetic reversing valve YA16, and a P port of the sixteenth electromagnetic reversing valve YA16 is connected to an inlet of the tenth cartridge valve C10. An outlet of the first accumulator AC1 is provided with a first pressure sensor BP1. A hydraulic control port of the eleventh cartridge valve C11 is connected to the outlet thereof, and a hydraulic control port of the twelfth cartridge valve C12 is connected to the outlet thereof. A hydraulic control port of the nineteenth cartridge valve C19 is connected to a neutral outlet of a first shuttle valve S1. A left inlet of the first shuttle valve S1 is connected to an outlet of the nineteenth cartridge valve C19. A right inlet of the first shuttle valve S1 is connected to an A port of an eighth electromagnetic reversing valve YA8. A P port of the eighth electromagnetic reversing valve YA8 is connected to an inlet of the nineteenth cartridge valve C19. An oil passage of the central cylinder 5 is provided with a third pressure sensor BP3. A hydraulic control port of the twentieth cartridge valve C20 is connected to the outlet thereof, and a hydraulic control port of the twenty-first cartridge valve C21 is connected to the outlet thereof. A hydraulic control port of the twenty-second cartridge valve C22 is connected to an A port of a ninth electromagnetic reversing valve YA9, and a P port of the ninth electromagnetic reversing valve YA9 is connected to an inlet of the twenty-second cartridge valve C22. A hydraulic control port of the twenty-third cartridge valve C23 is connected to a neutral outlet of a second shuttle valve S2. A left inlet of the second shuttle valve S2 is connected to the outlet of the twenty-third cartridge valve C23, and a right inlet of the second shuttle valve S2 is connected to an A port of a seventh electromagnetic reversing valve YA7. A P port of the seventh electromagnetic reversing valve YA7 is connected to an inlet of the twenty-third cartridge valve C23. An oil passage of the side cylinder 6 is provided with a fourth pressure sensor BP4.

A hydraulic control port of the fifteenth cartridge valve C15 is connected to an inlet of an eighth pressure regulating valve F8, an inlet of a ninth pressure regulating valve F9, and a P port of a fourteenth electromagnetic reversing valve YA14. An outlet of the ninth pressure regulating valve F9 is connected to an A port of the fourteenth electromagnetic reversing valve YA14. A T port of the fourteenth electromagnetic reversing valve YA14 and an outlet of the eighth pressure regulating valve F8 are connected to the oil tank. A hydraulic control port of the sixteenth cartridge valve C16 is connected to an A port of an eleventh electromagnetic ball valve YA11. The eleventh electromagnetic ball valve YA11 is a two-position three-way valve, which has a P port connected to the outlet of the sixteenth cartridge valve C16. The outlet of the sixteenth cartridge valve C16 is further connected to the oil tank through a seventh pressure regulating valve F7. The inlet of the sixteenth cartridge valve C16 is further connected to a P port of a twelfth electromagnetic reversing valve YA12 through a throttle valve J1. A B port and a T port of the twelfth electromagnetic reversing valve YA12 are connected to the oil tank. A hydraulic control port of the seventeenth cartridge valve C17 is connected to a neutral outlet of a third shuttle valve S3. A left inlet of the third shuttle valve S3 is connected to the outlet of the seventeenth cartridge valve C17, and a right inlet of the third shuttle valve S3 is connected to an A port of a tenth electromagnetic reversing valve YA10. A P port of the tenth electromagnetic reversing valve YA10 is connected to an inlet of the seventeenth cartridge valve C17. A hydraulic control port of the eighteenth cartridge valve C18 is connected to an A port of a thirteenth electromagnetic reversing valve YA13. A P port of the thirteenth electromagnetic reversing valve YA13 is connected to the inlet of the eighteenth cartridge valve C18, and the outlet of the eighteenth cartridge valve C18 is connected to the oil tank.

A hydraulic control port of the twenty-sixth cartridge valve C26 is connected to an A port of an eighteenth electromagnetic reversing valve YA18. A B port of the eighteenth electromagnetic reversing valve YA18 is connected to the outlet of the twenty-sixth cartridge valve C26. A P port of the eighteenth electromagnetic reversing valve YA18 is connected to the main pressure oil passage G1. A T port of the eighteenth electromagnetic reversing valve YA18 is connected to the oil tank. A hydraulic control port of the twenty-seventh cartridge valve C27 is connected to an A port of a first three-position four-way reversing valve with a regen center through a first one-way valve D1. A hydraulic control port of the twenty-eighth cartridge valve C28 is connected to a neutral outlet of a fourth shuttle valve S4. A left inlet of the fourth shuttle valve S4 is connected to the outlet of the twenty-eighth cartridge valve C28, and a right inlet of the fourth shuttle valve S4 is connected to a B port of the first three-position four-way reversing valve. A hydraulic control port of the twenty-ninth cartridge valve C29 is connected to the B port of the first three-position four-way reversing valve through a second one-way valve D2. A hydraulic control port of the thirtieth cartridge valve C30 is connected to an A port of the first three-position four-way reversing valve. An inlet of the thirtieth cartridge valve C30 is connected to a P port of the first three-position four-way reversing valve through a third one-way valve D3. A T port of the first three-position four-way reversing valve is connected to the oil tank.

An outlet of a large pump P1a of a first double gear pump is connected to inlets of first cartridge valve C1 and second cartridge valve C2. A hydraulic control port of the second cartridge valve C2 is connected to a B port of the first electromagnetic reversing valve YA1. An outlet of a small pump P1b of the first double gear pump is connected to inlets of a third cartridge valve C3 and a fourth cartridge valve C4. A hydraulic control port of the fourth cartridge valve C4 is connected to a B port of a second electromagnetic reversing valve YA2.

An outlet of a large pump P2a of a second double gear pump is connected to inlets of a fifth cartridge valve C5 and a sixth cartridge valve C6. A hydraulic control port of the sixth cartridge valve C6 is connected to a B port of a third electromagnetic reversing valve YA3.

An outlet of a small pump P2b of the second double gear pump is connected to inlets of a seventh cartridge valve C7 and an eighth cartridge valve C8. A hydraulic control port of the eighth cartridge valve C8 is connected to a B port of a fourth electromagnetic reversing valve YA4. Outlets of the first cartridge valve C1, the third cartridge valve C3, the fifth cartridge valve C5, and the seventh cartridge valve C7 are connected to the main pressure oil passage G1 and an inlet of a ninth cartridge valve C9. A hydraulic control port of the ninth cartridge valve C9 is connected to a B port of a fifth electromagnetic reversing valve YA5. T ports of the first electromagnetic reversing valve YA1, the second electromagnetic reversing valve YA2, the third electromagnetic reversing valve YA3, the fourth electromagnetic reversing valve YA4, and the fifth electromagnetic reversing valve YA5 are connected to the oil tank. Outlets of the second cartridge valve C2, the fourth cartridge valve C4, the sixth cartridge valve C6, the eighth cartridge valve C8, and the ninth cartridge valve C9 are connected to the oil tank.

The steps of a working cycle of the hydraulic press for an FRP product are as follows. (1) The slider goes down fast. The first electromagnetic reversing valve YA1 is energized to close the second cartridge valve C2. The second electromagnetic reversing valve YA2 is energized to close the fourth cartridge valve C4. The third electromagnetic reversing valve YA3 is energized to close the sixth cartridge valve C6. The fourth electromagnetic reversing valve YA4 is energized to close the eighth cartridge valve C8. The fifth electromagnetic reversing valve YA5 is energized to close the ninth cartridge valve C9. Thus, the main pressure oil passage G1 builds up pressure.

The seventh electromagnetic reversing valve YA7 is energized to open the twenty-third cartridge valve C23, and pressure oil enters the side cylinder 6. The eighth electromagnetic reversing valve YA8 is energized, such that the nineteenth cartridge valve C19 is opened, and the pressure oil enters the central cylinder 5.

The thirteenth electromagnetic reversing valve YA13 is energized to open the eighteenth cartridge valve C18. Meanwhile, the second proportional flow valve YAB receives a given voltage signal and opens to a maximum extent. The eleventh electromagnetic ball valve YA11 is energized to open the sixteenth cartridge valve C16, and the return cylinder 7 communicates with the oil tank. The slider 3 descends at a speed of 300-800 mm/s. Each filling valve D0 is opened, and the oil is filled into the central cylinder 5 and the side cylinder 6.

(2) The slider goes down slowly for pressing. The following describes the pressing modes. The central cylinder 5 implements pressing alone. The side cylinder 6 implements pressing alone. The central cylinder 5 first implements pressing alone, and then the central cylinder 5 and the side cylinder 6 implement pressing together. The side cylinders 6 first implement pressing alone, and then the central cylinder 5 and the side cylinders 6 implement pressing together. The slider descends at a speed of 1-40 mm/s.

Pressing Method 1: The eighth electromagnetic reversing valve YA8 is kept energized to keep the nineteenth cartridge valve C19 open, such that the pressure oil keeps entering the central cylinder 5 to implement 1,000-ton pressing. The seventh electromagnetic reversing valve YA7 is de-energized to make the twenty-third cartridge valve C23 close, and the side cylinder 6 does not implement pressing. The eleventh electromagnetic ball valve YA11 keeps energized to keep the sixteenth cartridge valve C16 open.

When the slider goes down fast to a set switching point, the given voltage signal received by the second proportional flow valve YAB gradually decreases according to a curve programmed by pulse oscillation software, such that the opening of the second proportional flow valve YAB gradually decreases to a certain value. Then, the thirteenth electromagnetic reversing valve YA13 is de-energized to make the eighteenth cartridge valve C18 close. Meanwhile, the fourteenth electromagnetic reversing valve YA14 is energized, and the fifteenth cartridge valve C15 is put into operation, such that the pressure of the return cylinder 7 is controlled by 3-8 MPa of the ninth pressure regulating valve F9. In this way, the slider 3 firstly goes down slowly with a back pressure under the pressing of the central cylinder alone.

The seventh electromagnetic reversing valve YA7 is energized to open the twenty-third cartridge valve C23, such that the pressure oil enters the side cylinder 6. The side cylinder 6 can achieve 2,000-ton pressing. The central cylinder and the side cylinders implement pressing together, so the slider 3 goes down slowly under the total pressing tonnage of 3,000.

Pressing Method 2: The seventh electromagnetic reversing valve YA7 is kept energized to keep the twenty-third cartridge valve C23 open, such that the pressure oil keeps entering the side cylinder 6 to implement 2000-ton pressing. The eighth electromagnetic reversing valve YA8 is de-energized to make the nineteenth cartridge valve C19 close, and the central cylinder 5 does not implement pressing. The eleventh electromagnetic ball valve YA11 keeps energized to keep the sixteenth cartridge valve C16 open.

When the slider goes down fast to a set switching point, the given voltage signal received by the second proportional flow valve YAB gradually decreases according to a curve programmed by pulse oscillation software, such that the opening of the second proportional flow valve YAB gradually decreases to a certain value. Then, the thirteenth electromagnetic reversing valve YA13 is de-energized to make the eighteenth cartridge valve C18 close. Meanwhile, the fourteenth electromagnetic reversing valve YA14 is energized, and the fifteenth cartridge valve C15 is put into operation, such that the pressure of the return cylinder 7 is controlled by 3-8 MPa of the ninth pressure regulating valve F9. In this way, the slider 3 firstly goes down slowly with a back pressure under the pressing of the side cylinder alone.

The eighth electromagnetic reversing valve YA8 is energized to open the nineteenth cartridge valve C19, such that the pressure oil enters the central cylinder 5 to implement 1,000-ton pressing. The central cylinder and the side cylinders implement pressing together. The slider 3 goes down slowly under the total pressing tonnage of 3,000.

During the slow downward pressing of the slider, the pressure of the central cylinder 5 is controlled by the third pressure sensor BP3. When a set pressure is reached, the eighth electromagnetic reversing valve YA8 is de-energized, and the pressure at the left inlet of the first shuttle valve S1 ensures that the nineteenth cartridge valve C19 is closed. The pressure of the side cylinder 6 is controlled by the fourth pressure sensor BP4. When a set pressure is reached, the seventh electromagnetic reversing valve YA7 is de-energized, and the pressure at the left inlet of the second shuttle valve S2 ensures that the twenty-third cartridge valve C23 is closed.

During the slow downward pressing of the slider, when the pressure sensor at a pump port detects that the pressure is greater than 10 MPa, the first electromagnetic reversing valve YA1 and the third electromagnetic reversing valve YA3 are de-energized. The second cartridge valve C2 and the sixth cartridge valve C6 are open. The pressure oil from the large pump P1a of the first double gear pump returns to the oil tank through the second cartridge valve C2, and the pressure oil from the large pump P2a of the second double gear pump returns to the oil tank through the sixth cartridge valve C6. The second electromagnetic reversing valve YA2, the fourth electromagnetic reversing valve YA4, and the fifth electromagnetic reversing valve YA5 keep energized. The small pump P1b of the first double gear pump and the small pump P2b of the second double gear pump keep supplying oil to the main pressure oil passage G1 until the pressing action is completed.

(3) The slider maintains the pressure. Maintaining sealed pressure is adopted, accompanied by the same automatic pressure compensation control as that on the pressing action. When an oil pump is turned off, the pressure at the left inlet of the first shuttle valve S1 ensures that the nineteenth cartridge valve C19 is closed, and the pressure at the left inlet of the second shuttle valve S2 ensures that the twenty-third cartridge valve C23 is closed.

(4) The slider relieves pressure. The second electromagnetic reversing valve YA2 is energized to close the fourth cartridge valve C4, and the fifth electromagnetic reversing valve YA5 is energized to close the ninth cartridge valve C9. The pressure oil fed by the small pump P1b of the first double gear pump is supplied to the main pressure oil passage G1 through the third cartridge valve C3, and pressure buildup is achieved.

The ninth electromagnetic reversing valve YA9 is energized to open the twenty-second cartridge valve C22. The twentieth cartridge valve C20 and the twenty-first cartridge valve C21 are opened. The central cylinder 5 is pre-relieved of pressure through the twentieth cartridge valve C20 and the twenty-second cartridge valve C22. The side cylinder 6 is pre-relieved of pressure through the twenty-first cartridge valve C21 and the twenty-second cartridge valve C22.

The sixteenth electromagnetic reversing valve YA16 is energized to open the tenth cartridge valve C10. The seventeenth electro-hydraulic reversing valve YA17 is energized, such that the pressure oil enters the hydraulic control port of each filling valve D0 through the tenth cartridge valve C10, the eleventh cartridge valve C11, the twelfth cartridge valve C12, and the A port of the seventeenth electro-hydraulic reversing valve YA17. Each filling valve D0 is opened to achieve complete pressure relief.

The first accumulator AC1 can play a stabilizing role to fill the pipeline with oil, so as to improve the response time of opening each filling valve D0, and realize rapid pressure relief. The seventeenth electro-hydraulic reversing valve YA17 responds fast and can open each filling valve D0 fast, stably, and reliably with the help of the first accumulator AC1.

(5) The mold opening cylinder ejects. The second electromagnetic reversing valve YA2 and the fifth electromagnetic reversing valve YA5 keep energized. The first electromagnetic reversing valve YA1 is energized, and the first double gear pump supplies oil to the main pressure oil passage G1 and builds up the pressure. The third electromagnetic reversing valve YA3 and the fourth electromagnetic reversing valve YA4 are de-energized, and the second double gear pump stops supplying oil.

The tenth electromagnetic reversing valve YA10 is de-energized, such that the seventeenth cartridge valve C17 is closed, and the oil passage of the return cylinder 7 is closed. The ninth electromagnetic reversing valve YA9 keeps energized to keep the twenty-second cartridge valve C22, the twentieth cartridge valve C20, and the twenty-first cartridge valve C21 open. The central cylinder 5 and the side cylinder 6 are kept in communication with the oil tank.

The sixteenth electromagnetic reversing valve YA16 is kept energized to keep the tenth cartridge valve C10 open. The seventeenth electro-hydraulic reversing valve YA17 keeps energized, such that the pressure oil enters the hydraulic control port of each filling valve D0 through the tenth cartridge valve C10, the eleventh cartridge valve C11, the twelfth cartridge valve C12, and the A port of the seventeenth electro-hydraulic reversing valve YA17. Each filling valve D0 keeps open.

A right coil YA19 of the first three-position four-way reversing valve is energized to close the thirtieth cartridge valve C30. The hydraulic control port of the twenty-ninth cartridge valve C29 is relieved of the pressure to the B port of the first three-position four-way reversing valve through the second one-way valve D2. The eighteenth electromagnetic reversing valve YA18 is energized to open the twenty-sixth cartridge valve C26. The pressure oil enters the lower chamber of the mold opening cylinder 8 through the twenty-sixth cartridge valve C26 and the twenty-eighth cartridge valve C28, such that a piston rod of the mold opening cylinder 8 is extended to realize the mold opening. The upper chamber of the mold opening cylinder 8 returns oil to the oil tank through the twenty-ninth cartridge valve C29. The slider is slowly raised under the action of the mold opening cylinder. According to the adhesion of the FRP product, the mold opening speed is controlled at 1-40 mm/s. An upper mold and a lower mold are separated first to avoid damage to the FRP workpiece by direct return. The mold opening cylinder stops after reaching a limit. The pressure at the left inlet of the fourth shuttle valve S4 ensures that the twenty-eighth cartridge valve C28 is closed, preventing the slider from sliding down.

(6) The slider returns. The first electromagnetic reversing valve YA1, the second electromagnetic reversing valve YA2, and the fifth electromagnetic reversing valve YA5 keep energized. The third electromagnetic reversing valve YA3 and the fourth electromagnetic reversing valve YA4 are energized, and the first double gear pump and the second double gear pump jointly supply oil to the main pressure oil passage G1 and build up the pressure.

The ninth electromagnetic reversing valve YA9 keeps energized to keep the twenty-second cartridge valve C22 open. The sixteenth electromagnetic reversing valve YA16 is energized to open the tenth cartridge valve C10. The seventeenth electro-hydraulic reversing valve YA17 is energized to build up a pressure at the hydraulic control ports of each filling valve D0 so as to make each filling valve open. The central cylinder 5 and the side cylinder 6 return the pressure oil to the oil tank.

The tenth electromagnetic reversing valve YA10 is energized to open the seventeenth cartridge valve C17. The pressure oil flows through the seventeenth cartridge valve C17 and pushes open the sixteenth cartridge valve C16 into the return cylinder 7. The slider goes up at a speed of 400 mm/s. The sixteenth cartridge valve C16 cooperates with the eleventh electromagnetic ball valve YA11 to effectively prevent the slider from sliding down.

The first proportional flow valve YAA opens as required by a control system. The pressure oil in the second accumulator AC2 to the fifth accumulator AC5 is supplemented into the return oil passage to meet the requirement of a fast return. The opening size of the first proportional flow valve YAA is controlled by a pulse oscillation curve.

(7) The mold opening cylinder returns. The first proportional flow valve YAA is closed, and the oil passage from the second accumulator AC2 to the fifth accumulator AC5 is cut off. The first electromagnetic reversing valve YA1, the second electromagnetic reversing valve YA2, and the fifth electromagnetic reversing valve YA5 keep energized.

The eighteenth electromagnetic reversing valve YA18 is energized to open the twenty-sixth cartridge valve C26. The right coil YA19 of the first three-position four-way reversing valve is de-energized and a left coil YA20 thereof is energized, such that the thirtieth cartridge valve C30 is opened. The hydraulic control port of the twenty-seventh cartridge valve C27 is relieved of pressure to the A port of the first three-position four-way reversing valve through the first one-way valve D1. The pressure oil enters the upper chamber of the mold opening cylinder 8 through the twenty-sixth cartridge valve C26 and the thirtieth cartridge valve C30, such that the piston rod of the mold opening cylinder 8 is retracted. The lower chamber of the mold opening cylinder 8 returns the pressure oil to the oil tank through the twenty-seventh cartridge valve C27.

The first accumulator AC1 is filled with oil. When the slider presses, the sixteenth electromagnetic reversing valve YA16 is energized to open the tenth cartridge valve C10, and meanwhile, the first accumulator AC1 is supplemented with pressure. The de-energization of the sixteenth electromagnetic directional valve YA16 is controlled by the first pressure sensor BP1.

The sixth accumulator AC6 is filled with oil. The control oil of the first proportional flow valve YAA and the second proportional flow valve YAB is provided by the accumulator AC6. The accumulator AC6 is filled with oil by the constant-power variable pump P3. The constant-power variable pump P3 is driven by a 7.5 KW three-phase asynchronous motor. The sixth electromagnetic reversing valve YA6 is energized to close the twenty-fifth cartridge valve C25. The constant-power variable pump P3 fills the sixth accumulator AC6 with oil through the twenty-fourth cartridge valve C24. The filling pressure is detected and controlled by the fifth pressure sensor BPS.

The four large accumulators are filled with oil. When the slider enters the pressure maintaining state, the first electromagnetic reversing valve YA1, the third electromagnetic reversing valve YA3, and the fifth electromagnetic reversing valve YA5 are energized. The large pump P1a of the first double gear pump and the large pump P2a of the second double gear pump supply oil to the main pressure oil passage G1. The fifteenth electromagnetic reversing valve YA15 is energized to open the fourteenth cartridge valve C14. The pressure oil is filled into the large accumulators, i.e. the second accumulator AC2 to the fifth accumulator AC5, through the thirteenth cartridge valve C13. The filling pressure is controlled by a second pressure sensor BP2.

The pin cylinder is extended. When the mold of the hydraulic press needs repair or change, the slider returns to an upper limit position. The second electromagnetic reversing valve YA2 and the fifth electromagnetic reversing valve YA5 are energized, and the small pump P1b of the first double gear pump supplies oil to the main pressure oil passage G1. A right coil YA22 of the second three-position four-way reversing valve is energized, and a piston rod of the pin cylinder 9 is extended to lock the slider.

The pin cylinder is retracted: the second electromagnetic reversing valve YA2 and the fifth electromagnetic reversing valve YA5 keep energized, and the small pump P1b of the first double gear pump supplies oil to the main pressure oil passage G1. The right coil YA22 of the second three-position four-way reversing valve is de-energized and a left coil YA21 thereof is energized, such that the piston rod of the pin cylinder 9 is retracted to release the slider.

Micro-motion mold matching: the first electromagnetic reversing valve YA1, the second electromagnetic reversing valve YA2, the third electromagnetic reversing valve YA3, the fourth electromagnetic reversing valve YA4, and the fifth electromagnetic reversing valve YA5 are de-energized. The main pressure oil passage G1 is relieved of pressure. The seventh electromagnetic reversing valve YA7 is de-energized to make the twenty-third cartridge valve C23 close, and the side cylinder 6 does not implement pressing. The eighth electromagnetic reversing valve YA8 is de-energized to make the nineteenth cartridge valve C19 close, and the central cylinder 5 does not implement pressing. The fourteenth electromagnetic reversing valve YA14 is de-energized, such that the fifteenth cartridge valve C15 is closed. The eleventh electromagnetic ball valve YA11 keeps energized to keep the sixteenth cartridge valve C16 open. The twelfth electromagnetic reversing valve YA12 is energized, such that the return cylinder 7 communicates with the oil tank through the throttle valve J1. The slider 3 falls under its own weight to verify the accuracy of the mold setting. The pressure-free downward speed of the slider can be adjusted through the throttle valve J1, and the downward distance is controlled based on the energization time of the eleventh electromagnetic ball valve YA11.

The above described are merely preferred possible embodiments of the present disclosure and should not be construed as a limitation to the protection scope of the present disclosure. The present disclosure may have other implementations in addition to those described above. All technical solutions formed by equivalent replacements or equivalent transformations should fall within the protection scope of the present disclosure. The technical features that are not described herein can be implemented by using existing technology and will not be repeated herein.

What is claimed is:

1. A hydraulic press for a fiber-reinforced plastic (FRP) product, comprising a workbench, wherein four corners of the workbench are provided with uprights; the uprights are arranged in two rows front and rear, and tops of the uprights in each row are connected by an upper beam extending in a left-right direction; tie rods are inserted in the front and rear of each upright; the tie rods each have an upper end and a lower end, wherein the upper end protrudes from a top of the upper beam and is fixed to the upper beam by an upper nut, and the lower end protrudes from a bottom of the workbench and is fixed to the workbench by a lower nut; a central cylinder is provided at a center of the upper beam; side cylinders are symmetrically arranged on a left and a right of the central cylinder; lower ends of plungers of the central cylinder and the side cylinders are fixedly connected to a top of a slider; a return cylinder and a mold opening cylinder are arranged between the uprights on a same side; the return cylinders on the left and right are distributed diagonally, and the mold opening cylinders on the left and right are also distributed diagonally; and the central cylinder and the side cylinders are each connected to an oil tank through a filling valve.

2. The hydraulic press according to claim 1, wherein a main pressure oil passage is connected to an inlet of a tenth cartridge valve, and an outlet of the tenth cartridge valve is connected to an inlet of an eleventh cartridge valve; an outlet of the eleventh cartridge valve is connected to inlets of a first accumulator and a twelfth cartridge valve; an outlet of the twelfth cartridge valve is connected to a P port of a seventeenth electro-hydraulic reversing valve, and an A port of the seventeenth electro-hydraulic reversing valve is connected to a hydraulic control port of each filling valve; an oil port of the central cylinder is connected to an outlet of a nineteenth cartridge valve and an inlet of a twentieth cartridge valve; an oil port of each of the side cylinders is connected to an outlet of a twenty-third cartridge valve and an inlet of the twenty-first cartridge valve; inlets of the nineteenth cartridge valve and the twenty-third cartridge valve are connected to the main pressure oil passage; outlets of the twentieth cartridge valve and the twenty-first cartridge valve are connected to an inlet of a twenty-second cartridge valve; and an outlet of the twenty-second cartridge valve is connected to the oil tank.

3. The hydraulic press according to claim 2, wherein an oil port of the return cylinder is connected to an outlet of a sixteenth cartridge valve; an inlet of the sixteenth cartridge valve is connected to an outlet of a seventeenth cartridge valve, an inlet of a fifteenth cartridge valve, and an A port of a second proportional flow valve; a B port of the second proportional flow valve is connected to an inlet of an eighteenth cartridge valve; and an outlet of the eighteenth cartridge valve is connected to the oil tank.

4. The hydraulic press according to claim 3, wherein an oil port of a lower chamber of the mold opening cylinder is connected to an outlet of a twenty-eighth cartridge valve and an inlet of a twenty-seventh cartridge valve; an oil port of an upper chamber of the mold opening cylinder is connected to an outlet of a thirtieth cartridge valve and an inlet of a twenty-ninth cartridge valve; inlets of the twenty-eighth cartridge valve and the thirtieth cartridge valve are connected to an outlet of a twenty-sixth cartridge valve; an inlet of the twenty-sixth cartridge valve is connected to the main pressure oil passage; and outlets of the twenty-seventh cartridge valve and the twenty-ninth cartridge valve are connected to the oil tank.

5. The hydraulic press according to claim 4, wherein an inlet of a fourteenth cartridge valve and a B port of a first proportional flow valve are connected to the main pressure oil passage; an outlet of the fourteenth cartridge valve is connected to an inlet of a thirteenth cartridge valve, and an outlet of the thirteenth cartridge valve is connected to a primary accumulator and an A port of the first proportional flow valve; control oil ports of the first proportional flow valve and the second proportional flow valve are connected to outlets of a sixth accumulator and a twenty-fourth cartridge valve; an inlet of the twenty-fourth cartridge valve is connected to an outlet of a constant-power variable pump and an inlet of a twenty-fifth cartridge valve, and an outlet of the twenty-fifth cartridge valve is connected to the oil tank; a hydraulic control port of the twenty-fifth cartridge valve is connected to an inlet of a tenth pressure regulating valve and a B port of a sixth electromagnetic reversing valve; a T port of the sixth electromagnetic reversing valve and an outlet of the tenth pressure regulating valve are connected to the oil tank; a hydraulic control port of a fourteenth cartridge valve is connected to an A port of a fifteenth electromagnetic reversing valve; a P port of the fifteenth electromagnetic reversing valve is connected to an inlet of the fourteenth cartridge valve; an outlet of the primary accumulator is provided with a second pressure sensor; and an outlet of the sixth accumulator is provided with a fifth pressure sensor.

6. The hydraulic press according to claim 2, wherein the main pressure oil passage is connected to a P port of a second three-position four-way reversing valve with a float center; an A port of the second three-position four-way reversing valve is connected to an inlet of a fourth one-way valve and a hydraulic control port of a fifth one-way valve; a B port of the second three-position four-way reversing valve is connected to an inlet of the fifth one-way valve and a hydraulic control port of the fourth one-way valve; an outlet of the fourth one-way valve is connected to a lower chamber of a pin cylinder; and an outlet of the fifth one-way valve is connected to an upper chamber of the pin cylinder.

7. The hydraulic press according to claim 2, wherein a hydraulic control port of the tenth cartridge valve is connected to an A port of a sixteenth electromagnetic reversing valve, and a P port of the sixteenth electromagnetic reversing valve is connected to an inlet of the tenth cartridge valve; an outlet of the first accumulator is provided with a first pressure sensor; a hydraulic control port of the eleventh cartridge valve is connected to an outlet of the eleventh cartridge valve, and a hydraulic control port of the twelfth cartridge valve is connected to an outlet thereof the twelfth cartridge valve; a hydraulic control port of the nineteenth cartridge valve is connected to a neutral outlet of a first shuttle valve; a left inlet of the first shuttle valve is connected to an outlet of the nineteenth cartridge valve; a right inlet of the first shuttle valve is connected to an A port of an eighth electromagnetic reversing valve; a P port of the eighth electromagnetic reversing valve is connected to an inlet of the nineteenth cartridge valve; an oil passage of the central cylinder is provided with a third pressure sensor; a hydraulic control port of the twentieth cartridge valve is connected to an outlet of the twentieth cartridge valve, and a hydraulic control port of the twenty-first cartridge valve is connected to an outlet of the twenty-first cartridge valve; a hydraulic control port of the twenty-second cartridge valve is connected to an A port of a ninth electromagnetic reversing valve, and a P port of the ninth electromagnetic reversing valve is connected to an inlet of the twenty-second cartridge valve; a hydraulic control port of the twenty-third cartridge valve is connected to a neutral outlet of a second shuttle valve; a left inlet of the second shuttle valve is connected to an outlet of the twenty-third cartridge valve, and a right inlet of the second shuttle valve is connected to an A port of a seventh electromagnetic reversing valve; a P port of the seventh electromagnetic reversing valve is connected to an inlet of the twenty-third cartridge valve; and an oil passage of the side cylinder is provided with a fourth pressure sensor.

8. The hydraulic press for an FRP product according to claim 3, wherein a hydraulic control port of the fifteenth cartridge valve is connected to an inlet of an eighth pressure regulating valve, an inlet of a ninth pressure regulating valve, and a P port of a fourteenth electromagnetic reversing valve; an outlet of the ninth pressure regulating valve is connected to an A port of the fourteenth electromagnetic reversing valve; a T port of the fourteenth electromagnetic reversing valve and an outlet of the eighth pressure regulating valve are connected to the oil tank; a hydraulic control port of the sixteenth cartridge valve is connected to an A port of an eleventh electromagnetic ball; the eleventh electromagnetic ball valve is a two-position three-way valve, the eleventh electromagnetic ball valve has a P port connected to an outlet of the sixteenth cartridge valve; the outlet of the sixteenth cartridge valve is further connected to the oil tank through a seventh pressure regulating valve; an inlet of the sixteenth cartridge valve is further connected to a P port of a twelfth electromagnetic reversing valve through a throttle valve; a B port and a T port of the twelfth electromagnetic reversing valve are connected to the oil tank; a hydraulic control port of the seventeenth cartridge valve is connected to a neutral outlet of a third shuttle valve; a left inlet of the third shuttle valve is connected to an outlet of the seventeenth cartridge valve, and a right inlet of the third shuttle valve is connected to an A port of a tenth electromagnetic reversing valve; a P port of the tenth electromagnetic reversing valve is connected to an inlet of the seventeenth cartridge valve; a hydraulic control port of the eighteenth cartridge valve is connected to an A port of a thirteenth electromagnetic reversing valve; a P port of the thirteenth electromagnetic reversing valve is connected to an inlet of the eighteenth cartridge valve; and an outlet of the eighteenth cartridge valve is connected to the oil tank.

9. The hydraulic press according to claim 4, wherein a hydraulic control port of the twenty-sixth cartridge valve is connected to an A port of an eighteenth electromagnetic reversing valve; a B port of the eighteenth electromagnetic reversing valve is connected to an outlet of the twenty-sixth cartridge valve; a P port of the eighteenth electromagnetic reversing valve is connected to the main pressure oil passage; a T port of the eighteenth electromagnetic reversing valve is connected to the oil tank; a hydraulic control port of the twenty-seventh cartridge valve is connected to an A port of a first three-position four-way reversing valve with a regen center through a first one-way valve; a hydraulic control port of the twenty-eighth cartridge valve is connected to a neutral outlet of a fourth shuttle valve; a left inlet of the fourth shuttle valve is connected to an outlet of the twenty-eighth cartridge valve, and a right inlet of the fourth shuttle valve is connected to a B port of the first three-position four-way reversing valve; a hydraulic control port of the twenty-ninth cartridge valve is connected to the B port of the first three-position four-way reversing valve through a second one-way valve; a hydraulic control port of the thirtieth cartridge valve is connected to the A port of the first three-position four-way reversing valve; an inlet of the thirtieth cartridge valve is connected to a P port of the first three-position four-way reversing valve through a third one-way valve; and a T port of the first three-position four-way reversing valve is connected to the oil tank.

10. The hydraulic press according to claim 2, wherein an outlet of a first pump of a first double gear pump is connected to inlets of a first cartridge valve and a second cartridge valve; a hydraulic control port of the second cartridge valve is connected to a B port of a first electromagnetic reversing valve; an outlet of a second pump of the first double gear pump is connected to inlets of a third cartridge valve and a fourth cartridge valve; a hydraulic control port of the fourth cartridge valve is connected to a B port of a second electromagnetic reversing valve; an outlet of a large-first pump of a second double gear pump is connected to inlets of a fifth cartridge valve and a sixth cartridge valve; a hydraulic control port of the sixth cartridge valve is connected to a B port of a third electromagnetic reversing valve; an outlet of a small second pump of the second double gear pump is connected to inlets of a seventh cartridge valve and an eighth cartridge valve; a hydraulic control port of the eighth cartridge valve is connected to a B port of a fourth electromagnetic reversing valve; outlets of the first cartridge valve, the third cartridge valve, the fifth cartridge valve, and the seventh cartridge valve are connected to the main pressure oil passage and an inlet of a ninth cartridge valve; a hydraulic control port of the ninth cartridge valve is connected to a B port of a fifth electromagnetic reversing valve; T ports of the first electromagnetic reversing valve, the second electromagnetic reversing valve, the third electromagnetic reversing valve, the fourth electromagnetic reversing valve, and the fifth electromagnetic reversing valve are connected to the oil tank; and outlets of the second cartridge valve, the fourth cartridge valve, the sixth cartridge valve, the eighth cartridge valve, and the ninth cartridge valve are connected to the oil tank.

11. The hydraulic press according to claim 3, wherein an outlet of a first pump of a first double gear pump is connected to inlets of a first cartridge valve and a second cartridge valve; a hydraulic control port of the second cartridge valve is connected to a B port of a first electromagnetic reversing valve; an outlet of a second pump of the first double gear pump is connected to inlets of a third cartridge valve and a fourth cartridge valve; a hydraulic control port of the fourth cartridge valve is connected to a B port of a second electromagnetic reversing valve; an outlet of a first pump of a second double gear pump is connected to inlets of a fifth cartridge valve and a sixth cartridge valve; a hydraulic control port of the sixth cartridge valve is connected to a B port of a third electromagnetic reversing valve; an outlet of a second pump of the second double gear pump is connected to inlets of a seventh cartridge valve and an eighth cartridge valve; a hydraulic control port of the eighth cartridge valve is connected to a B port of a fourth electromagnetic reversing valve; outlets of the first cartridge valve, the third cartridge valve, the fifth cartridge valve, and the seventh cartridge valve are connected to the main pressure oil passage and an inlet of a ninth cartridge valve; a hydraulic control port of the ninth cartridge valve is connected to a B port of a fifth electromagnetic reversing valve; T ports of the first electromagnetic reversing valve, the second electromagnetic reversing valve, the third electromagnetic reversing valve, the fourth electromagnetic reversing valve, and the fifth electromagnetic reversing valve are connected to the oil tank; and outlets of the second cartridge valve, the fourth cartridge valve, the sixth cartridge valve, the eighth cartridge valve, and the ninth cartridge valve are connected to the oil tank.

12. The hydraulic press according to claim 4, wherein an outlet of a first pump of a first double gear pump is connected to inlets of a first cartridge valve and a second cartridge valve; a hydraulic control port of the second cartridge valve is connected to a B port of a first electromagnetic reversing valve; an outlet of a second pump of the first double gear pump is connected to inlets of a third cartridge valve and a fourth cartridge valve; a hydraulic control port of the fourth cartridge valve is connected to a B port of a second electromagnetic reversing valve; an outlet of a first pump of a second double gear pump is connected to inlets of a fifth cartridge valve and a sixth cartridge valve; a hydraulic control port of the sixth cartridge valve is connected to a B port of a third electromagnetic reversing valve; an outlet of a second pump of the second double gear pump is connected to inlets of a seventh cartridge valve and an eighth cartridge valve; a hydraulic control port of the eighth cartridge valve is connected to a B port of a fourth electromagnetic reversing valve; outlets of the first cartridge valve, the third cartridge valve, the fifth cartridge valve, and the seventh cartridge valve are connected to the main pressure oil passage and an inlet of a ninth cartridge valve; a hydraulic control port of the ninth cartridge valve is connected to a B port of a fifth electromagnetic reversing valve; T ports of the first electromagnetic reversing valve, the second electromagnetic reversing valve, the third electromagnetic reversing valve, the fourth electromagnetic reversing valve, and the fifth electromagnetic reversing valve are connected to the oil tank; and outlets of the second cartridge valve, the fourth cartridge valve, the sixth cartridge valve, the eighth cartridge valve, and the ninth cartridge valve are connected to the oil tank.

13. The hydraulic press according to claim 5, wherein an outlet of a first pump of a first double gear pump is connected to inlets of a first cartridge valve and a second cartridge valve; a hydraulic control port of the second cartridge valve is connected to a B port of a first electromagnetic reversing valve; an outlet of a second pump of the first double gear pump is connected to inlets of a third cartridge valve and a fourth cartridge valve; a hydraulic control port of the fourth cartridge valve is connected to a B port of a second electromagnetic reversing valve; an outlet of a first pump of a second double gear pump is connected to inlets of a fifth cartridge valve and a sixth cartridge valve; a hydraulic control port of the sixth cartridge valve is connected to a B port of a third electromagnetic reversing valve; an outlet of a second pump of the second double gear pump is connected to inlets of a seventh cartridge valve and an eighth cartridge valve; a hydraulic control port of the eighth cartridge valve is connected to a B port of a fourth electromagnetic reversing valve; outlets of the first cartridge valve, the third cartridge valve, the fifth cartridge valve, and the seventh cartridge valve are connected to the main pressure oil passage and an inlet of a ninth cartridge valve; a hydraulic control port of the ninth cartridge valve is connected to a B port of a fifth electromagnetic reversing valve; T ports of the first electromagnetic reversing valve, the second electromagnetic reversing valve, the third electromagnetic reversing valve, the fourth electromagnetic reversing valve, and the fifth electromagnetic reversing valve are connected to the oil tank; and outlets of the second cartridge valve, the fourth cartridge valve, the sixth cartridge valve, the eighth cartridge valve, and the ninth cartridge valve are connected to the oil tank.

14. The hydraulic press according to claim 6, wherein an outlet of a first pump of a first double gear pump is connected to inlets of a first cartridge valve and a second cartridge valve; a hydraulic control port of the second cartridge valve is connected to a B port of a first electromagnetic reversing valve; an outlet of a second pump of the first double gear pump is connected to inlets of a third cartridge valve and a fourth cartridge valve; a hydraulic control port of the fourth cartridge valve is connected to a B port of a second electromagnetic reversing valve; an outlet of a first pump of a second double gear pump is connected to inlets of a fifth cartridge valve and a sixth cartridge valve; a hydraulic control port of the sixth cartridge valve is connected to a B port of a third electromagnetic reversing valve; an outlet of a second pump of the second double gear pump is connected to inlets of a seventh cartridge valve and an eighth cartridge valve; a hydraulic control port of the eighth cartridge valve is connected to a B port of a fourth electromagnetic reversing valve; outlets of the first cartridge valve, the third cartridge valve, the fifth cartridge valve, and the seventh cartridge valve are connected to the main pressure oil passage and an inlet of a ninth cartridge valve; a hydraulic control port of the ninth cartridge valve is connected to a B port of a fifth electromagnetic reversing valve; T ports of the first electromagnetic reversing valve, the second electromagnetic reversing valve, the third electromagnetic reversing valve, the fourth electromagnetic reversing valve, and the fifth electromagnetic reversing valve are connected to the oil tank; and outlets of the second cartridge valve, the fourth cartridge valve, the sixth cartridge valve, the eighth cartridge valve, and the ninth cartridge valve are connected to the oil tank.

15. The hydraulic press according to claim 7, wherein an outlet of a first pump of a first double gear pump is connected to inlets of a first cartridge valve and a second cartridge valve; a hydraulic control port of the second cartridge valve is connected to a B port of a first electromagnetic reversing valve; an outlet of a second pump of the first double gear pump is connected to inlets of a third cartridge valve and a fourth cartridge valve; a hydraulic control port of the fourth cartridge valve is connected to a B port of a second electromagnetic reversing valve; an outlet of a first pump of a second double gear pump is connected to inlets of a fifth cartridge valve and a sixth cartridge valve; a hydraulic control port of the sixth cartridge valve is connected to a B port of a third electromagnetic reversing valve; an outlet of a second pump of the second double gear pump is connected to inlets of a seventh cartridge valve and an eighth cartridge valve; a hydraulic control port of the eighth cartridge valve is connected to a B port of a fourth electromagnetic reversing valve; outlets of the first cartridge valve, the third cartridge valve, the fifth cartridge valve, and the seventh cartridge valve are connected to the main pressure oil passage and an inlet of a ninth cartridge valve; a hydraulic control port of the ninth cartridge valve is connected to a B port of a fifth electromagnetic reversing valve; T ports of the first electromagnetic reversing valve, the second electromagnetic reversing valve, the third electromagnetic reversing valve, the fourth electromagnetic reversing valve, and the fifth electromagnetic reversing valve are connected to the oil tank; and outlets of the second cartridge valve, the fourth cartridge valve, the sixth cartridge valve, the eighth cartridge valve, and the ninth cartridge valve are connected to the oil tank.

16. The hydraulic press according to claim 8, wherein an outlet of a first pump of a first double gear pump is connected to inlets of a first cartridge valve and a second cartridge valve; a hydraulic control port of the second cartridge valve is connected to a B port of a first electromagnetic reversing valve; an outlet of a second pump of the first double gear pump is connected to inlets of a third cartridge valve and a fourth cartridge valve; a hydraulic control port of the fourth cartridge valve is connected to a B port of a second electromagnetic reversing valve; an outlet of a first pump of a second double gear pump is connected to inlets of a fifth cartridge valve and a sixth cartridge valve; a hydraulic control port of the sixth cartridge valve is connected to a B port of a third electromagnetic reversing valve; an outlet of a second pump of the second double gear pump is connected to inlets of a seventh cartridge valve and an eighth cartridge valve; a hydraulic control port of the eighth cartridge valve is connected to a B port of a fourth electromagnetic reversing valve; outlets of the first cartridge valve, the third cartridge valve, the fifth cartridge valve, and the seventh cartridge valve are connected to the main pressure oil passage and an inlet of a ninth cartridge valve; a hydraulic control port of the ninth cartridge valve is connected to a B port of a fifth electromagnetic reversing valve; T ports of the first electromagnetic reversing valve, the second electromagnetic reversing valve, the third electromagnetic reversing valve, the fourth electromagnetic reversing valve, and the fifth electromagnetic reversing valve are connected to the oil tank; and outlets of the second cartridge valve, the fourth cartridge valve, the sixth cartridge valve, the eighth cartridge valve, and the ninth cartridge valve are connected to the oil tank.

17. The hydraulic press according to claim 9, wherein an outlet of a first pump of a first double gear pump is connected to inlets of a first cartridge valve and a second cartridge valve; a hydraulic control port of the second cartridge valve is connected to a B port of a first electromagnetic reversing valve; an outlet of a second pump of the first double gear pump is connected to inlets of a third cartridge valve and a fourth cartridge valve; a hydraulic control port of the fourth cartridge valve is connected to a B port of a second electromagnetic reversing valve; an outlet of a first pump of a second double gear pump is connected to inlets of a fifth cartridge valve and a sixth cartridge valve; a hydraulic control port of the sixth cartridge valve is connected to a B port of a third electromagnetic reversing valve; an outlet of a second pump of the second double gear pump is connected to inlets of a seventh cartridge valve and an eighth cartridge valve; a hydraulic control port of the eighth cartridge valve is connected to a B port of a fourth electromagnetic reversing valve; outlets of the first cartridge valve, the third cartridge valve, the fifth cartridge valve, and the seventh cartridge valve are connected to the main pressure oil passage and an inlet of a ninth cartridge valve; a hydraulic control port of the ninth cartridge valve is connected to a B port of a fifth electromagnetic reversing valve; T ports of the first electromagnetic reversing valve, the second electromagnetic reversing valve, the third electromagnetic reversing valve, the fourth electromagnetic reversing valve, and the fifth electromagnetic reversing valve are connected to the oil tank; and outlets of the second cartridge valve, the fourth cartridge valve, the sixth cartridge valve, the eighth cartridge valve, and the ninth cartridge valve are connected to the oil tank.

* * * * *